United States Patent Office 2,900,386
Patented Aug. 18, 1959

2,900,386

PRODUCTION OF HETEROCYCLIC DICARBOXYLIC ACIDS

Bernhard Raecke, Dusseldorf, Bruno Blaser, Dusseldorf-Urdenbach, Werner Stein, Dusseldorf-Holthausen, Hubert Schirp, Dusseldorf, and Hartwig Schutt, Hagen, Westphalia, Germany, assignors to Henkel & Cie, G.m.b.H., Dusseldorf-Holthausen, Germany, a corporation of Germany No Drawing. Application November 2, 1956
Serial No. 619,924

Claims priority, application Germany November 4, 1955

15 Claims. (Cl. 260—250)

This invention relates to a process for the production of heterocyclic dicarboxylic acids, and more particularly to the production of heterocyclic symmetric dicarboxylic acids by subjecting heterocyclic monocarboxylic acids or heterocyclic asymmetric dicarboxylic acids to a heat treatment.

A number of processes for the production of heterocyclic dicarboxylic acids have been disclosed, but these known methods are often rather difficult to carry out on an industrial scale and do not produce very pure products. For example, isocinchomeric acid (pyridine-2,5-dicarboxylic acid) has heretofore been produced by a devious procedure involving the oxidation of 2-methyl-5-ethyl-pyridine with nitric acid. Similarly, dehydromucic acid (furan-2,5-dicarboxylic acid) has heretofore been produced by various involved methods from hexoses.

It is an object of the present invention to provide a simple and yet effective method of producing very pure heterocyclic symmetric dicarboxylic acids from readily accessible heterocyclic monocarboxylic or asymmetric dicarboxylic acids.

Other objects and advantages of the present invention will become apparent as the description proceeds.

We have found that salts of carboxylic acids the carboxyl groups of which are attached to a heterocyclic system with aromatic structure may be rearranged into the corresponding salts of heterocyclic dicarboxylic acids by heating these carboxylic acids in an inert atmosphere.

Suitable heterocyclic systems with aromatic structure are, for example, 5-membered and 6-membered heterocyclic rings with conjugated double bonds, such as furan, thiophene, pyrrole, α-pyran, α-thiopyran and pyridine. The heterocyclic rings may also be combined with other heterocyclic radicals of aromatic structure or with aromatic radicals, preferably with benzene rings. Such composite heterocyclic systems are, for example, quinoline, isoquinoline, indole, but also salts of other heterocyclic carboxylic acids, such as benzotriazole, benzimidazole, and the like, may be also be used.

The rearrangement reaction according to the present invention involves a shift of the carboxyl groups, which may take place within the molecule as well as between several molecules. If the starting material is the salt of a heterocyclic monocarboxylic acid, the rearrangement occurs between two molecules of monocarboxylic acid salt and produces one molecule of dicarboxylic acid and one molecule of the heterocyclic system free from carboxyl groups. However, if the starting material is a di- or polycarboxylic acid salt, a shift of carboxyl groups within the molecule as well as between molecules occurs.

In the case of monocyclic system, the carboxyl groups migrate preferably into the 2,5-positions, both in 5-membered as well as in 6-membered heterocyclic radicals. In addition, in 6-membered heterocyclic systems the 2,4,6-tricarboxylic configuration is favored. In the case of furan-1-carboxylic acid, a heterocyclic carboxylic acid which is derived from a heterocyclic system with one hetero atom, the reaction takes place in accordance with the following formula:

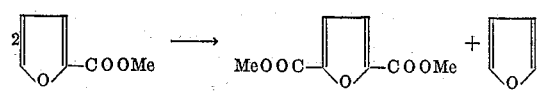

in which Me represents a monovalent metal, preferably an alkali metal. In the case of pyridine-monocarboxylic acid, a carboxylic acid which is derived from a 6-membered heterocyclic system with one hetero atom, the reaction takes place in accordance with the following formula:

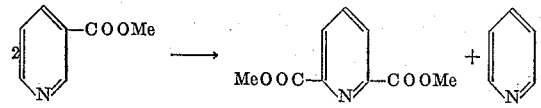

Me being a monovalent metal atom, preferably an alkali metal; that is, the principal product obtained thereby is the salt of isocinchomeric acid (pyridine-2,5-dicarboxylic acid); the salt of pyridine-2,4,6-tricarboxylic acid may also be formed as a side product.

The starting materials are salts of mono-, di- and/or polycarboxylic acids of the above-named heterocyclic systems, preferably in the form of their alkali metal salts, especially the sodium and potassium salts. For reasons of economy it is preferred to avoid the use of the thallium, rubidium and cesium salts on an industrial scale, although these salts also produce satisfactory laboratory results. If the starting materials are di- or tricarboxylic acids of monocyclic 6-membered heterocyclic compounds, it is preferred to use those in which the carboxyl groups are not in the 2,5- or 2,4,6-positions. If the starting materials are dicarboxylic acids of 5-membered heterocyclic systems, it is preferred to employ those wherein the carboxyl groups are not in the 2,5-positions. In place of the salts, mixtures which form these salts may be used; for example, mixtures of the free acids, their chlorides or anhydrides and metal carbonates. Mixtures of several carboxylic acid salts may also be used, and in the case where the starting material consists of carboxylic acid salts which do not have the same number of carboxyl groups in the molecule, the quantitative ratio of the mixture may be chosen so that the number of carboxyl groups per heterocyclic system in the reaction mixture corresponds to the quantitative ratio of carboxyl groups per heterocyclic system which the end product is intended to contain. This ratio may lie within the range of 2 to 3 carboxyl groups per heterocyclic system. For example, if it is desired to obtain a symmetric pyridine-dicarboxylic acid salt as the principal product, a mixture may be used which consists of an equimolecular ratio of mono- and tricarboxylic acid salts. If the formation of pyridine-tricarboxylic acids is to be favored, the mixture may, for example, contain equimolecular amounts of pyridine-dicarboxylic acid salts and tetracarboxylic acid salts.

The carboxylic acid salts to be treated in accordance with the present invention are preferably employed in as dry a state as possible. If these salts are in the form of aqueous solutions, they may be transformed into dry powders in accordance with well-known procedures, but preferably by spray-drying and, if desired, subsequent additional drying of the powder to remove small traces of moisture.

In the case of some compounds of the type above-described, the rearrangement reaction already begins upon heating these compounds to temperatures above 275° C. The maximum temperature is that at which the reaction product noticeably decomposes. In most cases it is preferred not to raise the temperature above 500° C. The optimum rearrangement reaction temperature, however, is different from one case to the other. In many cases the optimum temperature range for the rearrangement lies from 20 to 40° C. below the melting point of the heterocyclic carboxylic acid salt at atmospheric pressure. For example, the potassium salt of pyromucic acid melts at atmospheric pressure between 350 and 360° C. accompanied by immediate strong decomposition; thus, the optimum reaction temperature for the rearrangement of this acid into the corresponding dicarboxylic acid is about 320 to 330° C. The potassium salt of thiophene-2-carboxylic acid melts incompletely at atmospheric pressure at about 420° C. without strong decomposition; the optimum rearrangement temperature for this compound, therefore, is about 370° C. For the potassium salt of pyrrole-1-carboxylic acid the optimum reaction temperature also lies below its melting point, which is about 340° C. In general, the optimum rearrangement temperature is in the range from 330 to 450° C. In this temperature range the rearrangement reaction mixture is sometimes more or less liquid, whereby the agitation of the reaction mixture (for example with a stirrer or in a rotary autoclave) is facilitated. The reaction mixture may be diluted with inert fillers, such as sand, finely divided coke or other forms of carbon, metal powders, metal shavings or chunks of metal. In addition, metal carbonates or bicarbonates, especially those of alkali metals, are suitable for use as the diluting agents.

We have further found that the rearrangement takes place especially satisfactorily if a superatmospheric pressure is maintained in the reaction vessel, which is advantageously produced by inert gases. Suitable inert gases for this purpose are primarily nitrogen and carbon dioxide, but methane, ethane, propane, butane or benzene vapor may also be used to create the inert atmosphere. The amount of superatmospheric pressure during the reaction may vary within wide limits; for example, it may be 10 atmospheres or more. It is preferred to introduce the inert gas into the reaction vessel under pressure prior to heating and at this point the pressure may be from 5 to 150 atmospheres if the inert gas used is at all capable of reaching such pressures in the cold. Upon heating, the pressure rises and may reach, for example, 15 to 500 atmospheres, preferably 100 to 250 atmospheres. The superatmospheric pressure may also be produced by adding to the starting material the corresponding heterocyclic compound free from carboxyl groups, for example pyridine if a nicotinic acid salt is the starting material.

It has further been found that the rearrangement reaction herein disclosed is favorably influenced by the presence of catalysts. Suitable catalysts for this purpose are the oxides, hydroxides, bicarbonates, carbonates, fluorides, chlorides, bromides, iodides, sulfates, nitrates, or other salts of metals the oxides of which are conductors of excess electrons. Such metals are, for example, lead, cadmium, zinc and mercury. These catalysts do not need to be used necessarily in the form of salts of inorganic acids; instead, the salts of organic acids, such as the corresponding formates, acetates, propionates, stearates, oleates, ricinoleates, benzoates, phthalates, etc., may also be used. Above all, the catalytically active metals may also be used in the form of the salts of the heterocyclic carboxylic acids which are subjected to the rearrangement reaction. The quantity of catalyst required to produce optimum results may vary within very wide limits; for example, from 0 to 15% and preferably from 0.5 to 5% by weight based on the weight of the initial rearrangement reaction mixture. If the catalysts used are the metal salts of the carboxylic acids being subjected to the rearrangement, the total number of cations necessary for neutralization of the carboxyl groups may be furnished by the catalyst metal. The catalysts may be finely divided throughout the reaction mixture or the starting material by transforming an aqueous solution of the heterocyclic carboxylic acid salts serving as the starting material, which has the catalyst dissolved or suspended therein, into a dry powder by spray-drying or on heated rollers. Finally, the free metal may also be used, which is of particular interest if the reaction vessel is lined with a layer of a catalytically active metal of the above-mentioned group.

During the rearrangement partial decarboxylation with accompanying re-formation of the heterocyclic system may occur. The heterocyclic compounds formed thereby may be recovered, for example, by releasing the pressure in the autoclave through a condenser.

In order to purify the raw rearrangement reaction product mixture, it is dissolved in water and freed from undesirable components by filtration or by treatment with activated charcoal or other purifying agents. The heterocyclic carboxylic acid salts formed by the rearrangement reaction are in most cases more insoluble in water than the starting materials, and may therefore be separated from the other components of the reaction product mixture, especially from unreacted starting material, by acidification of the aqueous solution with acids, such as mineral acids or organic acids, and subsequent crystallization as the corresponding free acid. The acid may then, if desired, be transformed into its derivatives, especially its chlorides or esters; in the case of esters, the methyl and ethyl alcohol esters are of particular interest. The transformation into the esters or chlorides may, however, also be carried out with the raw or unpurified reaction product, without prior isolation of the free acid, in accordance with known methods. For this purpose the reaction product mixture is transformed into a powder. The spray-drying of aqueous solutions of the reaction product is again the most favorable method because the dry salt formed thereby is in a particularly reactive form.

The process in accordance with the present invention has made it possible to obtain heterocyclic di- or polycarboxylic acids by very simple methods. For example, isocinchomeric acid may now be produced with high yields by merely heating salts of nicotinic acid in an inert atmosphere. Similarly, dihydromucic acid, that is, furan-2,5-dicarboxylic acid, may be obtained by heating salts of pyromucic acid in an inert atmosphere, which in turn is readily accessible through furfural produced from pentoses.

The heterocyclic di- and polycarboxylic acids produced in accordance with the present invention are useful as reactants in all those cases where heretofore bi- and polyfunctional compounds, especially di- or polycarboxylic acids, have been used; for example, in the production of softeners, synthetic resins and as acid components in the production of poly-esters.

The following examples will further illustrate the present invention and enable others skilled in the art to understand it more completely, without limiting our invention thereto.

*Example I*

A mixture of 40 gm. of the potassium salt of nicotinic acid and 1.2 gm. cadmium fluoride was heated for 2 hours at 370° C. in a rotary autoclave having a volume of 0.2 liter, into which carbon dioxide was introduced prior to heating until the internal pressure reached 50 atmospheres. The pressure increased to 140 atmospheres during the heating step. The reaction product, which contained small amounts of pyridine, was dissolved in about 400 cc. water and after filtering off the catalyst and carbonaceous by-products the solution was acidified with hydrochloric acid. Upon cooling, 10.1 gm. isocinchomeric acid crystallized out, which corresponds to a yield of 48.8% of theory. After recrystallization from water, the melting point of the heterocyclic acid was 248° C., and its acid number was 669 (calculated 671). For identification of the acid it was boiled with methanol and a small amount of concentrated sulfuric acid under reflux. The dimethyl ester thus obtained was recrystallized and then had a melting point of 161° C. (163° C. according to the literature). The yield of pyridine, which theoretically should be 13 gm. in accordance with the equation

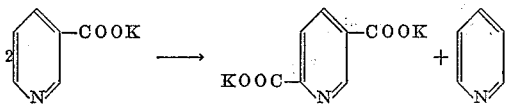

was not quantitatively determined; it was, however, formed in approximately the calculated amount.

Example II

A mixture of 40 gm. of the potassium salt of nicotinic acid and 1.2 gm. cadmium fluoride was heated for 1½ hours at 420° C. in a rotary autoclave having a volume of 0.2 liter, into which 50 atmospheres of carbon dioxide were introduced prior to heating. The pressure rose to 157 atmospheres during the heating step. The reaction product, which contained a minor amount of pyridine, was dissolved in about 200 cc. hot water, and the solution was purified with activated charcoal, filtered and acidified with hydrochloric acid. Upon cooling to 0° C., the precipitated isocinchomeric acid was separated by vacuum filtration and dried. The yield was 10.6 gm., which corresponds to 51.0% of the theoretical yield.

Example III

A mixture of 40 gm. of the potassium salt of picolinic acid and 1.2 gm. cadmium fluoride was heated for 2 hours at 380° C. in a rotary autoclave having a volume of 0.2 liter, into which 50 atmospheres carbon dioxide were introduced prior to heating. The pressure rose to 155 atmospheres during the heating step. The reaction product, which contained a minor amount of pyridine, was dissolved in about 200 cc. of hot water, and the solution was filtered and acidified with hydrochloric acid. After concentrating the solution by evaporation and cooling, 9.7 gm. isocinchomeric acid crystallized out, which corresponds to 46.8% of the theoretical yield; the acid number was 678. The acid was also identified through its dimethyl ester.

Example IV

A mixture of 40 gm. of the potassium salt of isonicotinic acid and 1.2 gm. cadmium fluoride was heated for 2 hours at 390° C. in a rotary autoclave having a volume of 0.2 liter, into which 50 atmospheres carbon dioxide were introduced prior to heating. The pressure rose to 130 atmospheres during the heating step. The reaction product, which weighed 32.4 gm., was dissolved in 200 cc. hot water, and the solution was filtered and acidified with hydrochloric acid. Upon cooling, 5.2 gm. of isocinchomeric acid crystallized out, which corresponds to 25% of the theoretical yield; the acid was identified through its dimethyl ester. After a short period of time, 5.3 gm. of the monopotassium salt of pyridine-2,4,6-tricarboxylic acid separated out, which was identified through its triethyl ester.

Example V 44 gm. of the dipotassium salt of quinolinic acid, which had previously been dried over $P_2O_5$ at 150° C. in a vacuum, were heated for 3 hours at 390° C. in a rotary autoclave having a volume of 0.2 liter, into which 50 atmospheres carbon dioxide had been introduced prior to heating. No catalyst was added. The internal pressure reached 150 atmospheres. The raw reaction product, which weighed 35.5 gm., was dissolved in about 200 cc. of hot water and the solution was treated with activated charcoal, filtered, and then acidified with hydrochloric acid. Upon cooling, 14.75 gm. isocinchomeric acid crystallized out, which corresponds to a yield of 48.8% of theory.

Example VI

A mixture of 55 gm. of the dipotassium salt of quinolinic acid, which had previously been dried as described in the preceding example, and 2 gm. cadmium fluoride was heated for 3 hours at 390° C. in a rotary autoclave having a volume of 0.2 liter, into which 50 atmospheres carbon dioxide had been introduced prior to heating. The maximum pressure reached during the heating step was 127 atmospheres. The gray raw reaction product, which weighed 50 gm., was dissolved in 300 cc. hot water, filtered and acidified with hydrochloric acid. Upon cooling, 16.0 gm. isocinchomeric acid crystallized out, which corresponds to 42.3% of the theoretical yield. After separating the crystalline isocinchomeric acid by filtration and evaporation, 7.6 gm. of the monopotassium salt of 2,4,6-pyridine-tricarboxylic acid separated out.

Example VII

A mixture of 40 gm. of the potassium salt of nicotinic acid was heated for 3 hours at 400° C. without a catalyst in a rotary autoclave having a volume of 0.2 liter, into which 50 atmospheres carbon dioxide had been introduced prior to heating. The pressure rose to 150 atmospheres during the heating step. The raw product, which weighed 23.1 gm., was worked up in the manner described in the preceding examples and yielded 6.4 gm. isocinchomeric acid, which corresponds to 37% of the theoretical yield.

Example VIII

A mixture of 40 gm. of the potassium salt of nicotinic acid was heated without a catalyst for 3 hours at 390° C. in a rotary autoclave having a volume of 0.2 liter, into which 50 atmospheres carbon dioxide had been introduced prior to heating. The pressure rose to 125 atmospheres during the heating step. The raw product, which weighed 26.4 gm., was worked up in the manner described in the preceding examples and yielded 8.0 gm. isocinchomeric acid, which corresponds to 38.7% of the theoretical yield.

Example IX

An intimate mixture of 62.4 gm. of the potassium salt of pyromucic acid (the potassium salt of furan-2-carboxylic acid) and 3.3 gm. (5%) cadmium fluoride was placed into a rotary autoclave having a volume of 0.2 liter. The air in the autoclave was displaced with carbon dioxide and then carbon dioxide was continued to be introduced until the internal pressure reached 50 atmospheres. Thereafter the autoclave was heated for 2 hours at 320° C. while rotating. During the heating step the maximum pressure developed was 200 atmospheres and upon cooling the pressure fell almost to the original pressure of 50 atmospheres. The raw product weighed 50.6 gm. and after pulverizing was dissolved in 0.5 liter of water and boiled. The carbon formed during the reaction and the catalyst were filtered off and the clear filtrate was acidified with hydrochloric acid until the pH was 3.5. Under these optimum precipitation conditions, the dehydromucic acid (furan-2,5-dicarboxylic acid) precipitated virtually completely, whereas small amounts of untransformed pyromucic acid crystallized out only upon further acidification of the filtrate. The dehydromucic acid formed in this manner (16.5 gm.) was dried and found to be 98% pure with an acid number of 700. The dehydromucic acid was identified through the following derivatives: the acid number of the acid which had been purified through its dimethyl ester was 712; the dimethyl ester had a boiling point of 155° C. at 15 mm. Hg, its melting point was 111° C., and its saponification number was 609.2; the dichloride had a boiling point of 122° C. at 12 mm. Hg, and its melting point was 79–80° C.

*Example X*

50 gm. of the potassium salt of pyromucic acid were heated in a rotary autoclave for one hour at 330° C. in an atmosphere of nitrogen with an initial pressure of 50 atmospheres under the conditions described in Example IX. Upon working up the raw product, which weighed 43.4 gm., in the manner described above, a yield of 8.3 gm. of unpurified dehydromucic acid was obtained.

*Example XI*

A mixture of 46.0 gm. of the potassium salt of thiophene-2-carboxylic acid and 2.3 gm. (5%) cadmium oxide was placed into an autoclave having a volume of 0.2 liter. This starting material was heated for one hour at 340° C. in an atmosphere of carbon dioxide having an initial pressure of 50 atmospheres. Thereafter the practically colorless powdery reaction product was suspended in 0.5 liter of water, the solution was filtered, and the filtrate was made acid to Congo red with hydrochloric acid. The precipitated dicarboxylic acid, which was very difficultly soluble, was digested with warm water and was thereby obtained in an amount of 14.9 gm. It was identified as thiophene-2,5-dicarboxylic acid through the following derivatives thereof: the dimethyl ester having a melting point of 147.5° C. and a boiling point of 176° C. at 14 mm. Hg; the diethyl ester having a melting point of 50° C.

*Example XII*

A mixture of 300 gm. of the potassium salt of pyromucic acid and 30 gm. anhydrous cadmium chloride was placed into a rotary autoclave having a volume of 1.5 liters. Carbon dioxide was then introduced into the autoclave at room temperature until the internal pressure reached 50 atmospheres. Thereafter the autoclave was heated to 300° C. for two hours, during which the internal pressure rose to 180 atmospheres and upon cooling again fell almost to the initial value. The reaction product weighed 284 gm. and was worked up in an analogous manner to that described in Example IX. The yield of dehydromucic acid was 106 gm.

*Example XIII*

A thick-walled test tube having a volume of 15 cc. and containing an intimate mixture of 3 gm. of the potassium salt of pyrrole-2-carboxylic acid, which had been dried at 140° C., and 0.3 gm. cadmium fluoride was provided with a glass wool stopper, was enveloped in glass wool, and then placed into a stationary autoclave. The autoclave was closed and carbon dioxide was introduced until the internal pressure reached 50 atmospheres. Thereafter the autoclave and its contents were heated for one hour at 300° C. Upon cooling and releasing the internal pressure, the practically colorless powdery reaction product, which weighed 2.8 gm., was dissolved in 70 cc. hot water, and the solution was filtered to remove the insoluble cadmium fluoride. The filtrate was acidified with hydrochloric acid until the pH was 2, whereupon very pure pyrrole-2,5-dicarboxylic acid precipitated after a short period of time. After drying, 1.26 gm. of the dicarboxylic acid were obtained. Upon standing for an extended period of time, additional amounts of the dicarboxylic acid precipitated from the filtrate, but the precipitate was impure due to the presence of dark condensation products. The pure acid was obtained therefrom through its esters.

*Example XIV*

A mixture of 20 parts by weight of the potassium salt of pyrazine-2,3-dicarboxylic acid and 1 part by weight of anhydrous cadmium chloride were heated in a rotary autoclave for one hour at 330° C. in an atmosphere of carbon dioxide having an initial cold pressure of 50 atmospheres. After releasing the internal pressure in the autoclave, the dark-brown reaction product was suspended in 300 parts by weight of water and the suspension was filtered to remove the catalyst and the insoluble side products. By boiling with activated charcoal, the brownish filtrate became virtually colorless. The filtrate was then acidified to pH=1, whereupon 4 parts by weight of pyrazine-2,5-dicarboxylic acid crystallized out, which corresponds to 30% of the theoretical yield based on the anhydrous acid.

*Example XV*

7.6 parts by weight of the potassium salt of pyrrole-α-carboxylic acid were admixed with 10% by weight cadmium fluoride and the mixture was heated in a rotary autoclave for one hour at 290° C. in an atmosphere of carbon dioxide having an initial pressure of 50 atmospheres. After treating the reaction product as described in Example XIII, 0.9 part of pure pyrrole-α-α'-dicarboxylic acid were obtained.

*Example XVI*

Corresponding to Example IX, 50 gm. of the sodium salt of pyromucic acid in admixture with 5% by weight cadmium fluoride were heated in an autoclave for one hour at 330° C. in an atmosphere of carbon dioxide having an initial pressure of 50 atmospheres. 4.6 gm. raw dehydromucic acid were obtained from the raw reaction product, which weighed 48.5 gm.

*Example XVII*

A mixture of 30 gm. of the potassium salt of quinaldic acid (anhydrous) and 1 gm. cadmium fluoride was heated in a rotary autoclave having a volume of 0.2 liter for two hours at 360° C. When the temperature reached 150° C., carbon dioxide was introduced until the internal pressure reached 50 atmospheres. The maximum pressure at 360° C. was 70 atmospheres. The reaction product was washed with ether to remove the quinoline formed during the reaction, and thereafter the remaining solids were dissolved in hot water and the solution was treated with activated charcoal and filtered. After acidification of the filtrate with hydrochloric acid 3.4 gm. of quinoline-2,4-dicarboxylic acid crystallized out, which corresponds to a yield of 22% of theory. Upon concentrating the mother liquor by evaporation, 2.2 gm. of a mixture of quinoline-mono- and dicarboxylic acids were obtained.

*Example XVIII*

30 gm. of the sodium salt of nicotinic acid were heated for 3 hours at 400° C. without a catalyst in a rotary autoclave having a volume of 0.2 liter. Prior to heating, carbon dioxide was introduced into the autoclave until the internal pressure reached 50 atmospheres; the maximum pressure at 400° C. was 150 atmospheres. The reaction product, which weighed 23.1 gm. was dissolved in about 250 cc. water and the solution was filtered and the filtrate acidified with hydrochloric acid. Upon concentrating the solution and allowing the same to cool, 6.4 gm. of isocinchomeric acid crystallized out, which corresponds to 37% of the theoretical yield.

When methane, ethane, propane, butane, benzene vapor or one of the other inert gases mentioned in this disclosure were substituted for the inert gas in any of the particular examples given above, substantially the same results were obtained. Similarly, the same reaction products were formed when the corresponding sodium salts, lithium salts, rubidium salts, cesium salts or thallium salt of the particular heterocyclic carboxylic acids in any of the examples were used as the starting material instead of the potassium salt, although the yields were not quite as high. Furthermore, similar high yields of the heterocyclic symmetrical dicarboxylic acids were obtained when metallic lead, cadmium, zinc, mercury or their oxides, hydroxides, bicarbonates, carbonates, fluorides, chlorides, bromides, iodides, sulfates, nitrates, formates, acetates, propionates, stearates, oleates, ricinoleates, benzoates or phthalates, or the lead, cadmium, zinc or mercury salts of the heterocyclic carboxylic acids used as starting materials in the present process were substituted as catalysts for the cadmium compounds in those examples above which illustrate the use of a catalyst.

While we have illustrated certain specific embodiments of the present invention, it will be apparent to persons skilled in the art that the invention is not limited to these embodiments, and that various changes and modifications may be made without departing from the spirit of the invention or the scope of the appended claims.

We claim:

1. The process of producing aromatic heterocyclic di- and tricarboxylic acids in which at least one carboxyl group stands in a neighboring position to a hetero-atom, which comprises heating a substantially anhydrous alkali metal salt of an aromatic heterocyclic carboxylic acid selected from the group consisting of aromatic heterocyclic dicarboxylic acids having the carboxyl groups attached to the heterocyclic ring in other than the positions of the products to be produced and aromatic heterocyclic monocarboxylic acids, the heterocyclic nucleus of said aromatic heterocyclic carboxylic acids comprising carbon atoms and at least one heteroatom selected from the group consisting of sulfur, oxygen and nitrogen, in an inert atmosphere under anhydrous conditions to a temperature above 275° C. and below the decomposition temperature of the starting material until at least one carboxyl group has changed position in comparison with the starting material, converting the aromatic heterocyclic carboxylic acid alkali metal salt formed thereby into the corresponding free aromatic heterocyclic carboxylic acid by acidifying and separating the free aromatic heterocyclic carboxylic acid so produced from the remaining reaction mixture components.

2. The process of producing aromatic heterocyclic dicarboxylic acids wherein the carboxyl radicals are attached to the aromatic heterocyclic ring in different relationship relative to each other than in the starting material, which comprises heating a substantially anhydrous alkali metal salt of an aromatic heterocyclic carboxylic acid selected from the group consisting of monocarboxylic and polycarboxylic aromatic heterocyclic acids, the heterocyclic nucleus of said aromatic heterocyclic carboxylic acid comprising carbon atoms and at least one heteroatom selected from the group consisting of sulfur, oxygen and nitrogen, in an inert atmosphere at superatmospheric pressures under anhydrous conditions to a temperature above about 275° C. and below the decomposition temperature of the starting material until a substantial amount of the corresponding alkali metal salt of an aromatic heterocyclic dicarboxylic acid differing from the starting material is formed, converting the aromatic heterocyclic dicarboxylic acid alkali metal salt so formed into the corresponding free aromatic heterocyclic dicarboxylic acid by acidifying and separating said free aromatic heterocyclic dicarboxylic acid so formed from the remaining reaction mixture components.

3. The process according to claim 1, wherein the inert atmosphere is produced by a gas selected from the group consisting of carbon dioxide, nitrogen, methane, ethane, propane, butane and benzene vapor.

4. The process according to claim 1, wherein the aromatic heterocyclic carboxylic acid alkali metal salt serving as the starting material is heated in the presence of a catalyst selected from the group consisting of metallic lead, cadmium, zinc, mercury and compounds of these metals.

5. The process of producing isocinchomeric acid, which comprises heating substantially anhydrous potassium salt of nicotinic acid under anhydrous conditions in an atmosphere of carbon dioxide to about 330° C. to about 450° C. until a substantial amount of the dipotassium salt of isocinchomeric acid is formed, dissolving the dipotassium salt of isocinchomeric acid in water, converting the dipotassium salt of isocinchomeric acid into free isocinchomeric acid by acidifying the aqueous solution with hydrochloric acid, and separating the free isocinchomeric acid from the acidified solution.

6. The process according to claim 5, wherein the potassium salt of nicotinic acid is heated in the presence of cadmium fluoride as a catalyst.

7. The process of producing isocinchomeric acid, which comprises heating substantially anhydrous potassium salt of picolinic acid under anhydrous conditions in an atmosphere of carbon dioxide to above about 330° C. and below the decomposition temperature of the starting material in the presence of cadmium fluoride as a catalyst until a substantial amount of the dipotassium salt of isocinchomeric acid is formed, dissolving the dipotassium salt of isocinchomeric acid in water, converting the dipotassium salt of isocinchomeric acid into free isocinchomeric acid by acidifying the aqueous solution with hydrochloric acid, and separating the free isocinchomeric acid from the acidified solution.

8. The process of producing isocinchomeric acid, which comprises heating substantially anhydrous potassium salt of quinolinic acid under anhydrous conditions in an atmosphere of carbon dioxide to above about 330° C. and below the decomposition temperature of the starting material until a substantial amount of the dipotassium salt of isocinchomeric acid is formed, dissolving the dipotassium salt of isocinchomeric acid in water, converting the dipotassium salt of isocinchomeric acid into free isocinchomeric acid by acidifying the aqueous solution with hydrochloric acid, and separating the free isocinchomeric acid from the acidified solution.

9. The process according to claim 8, wherein the potassium salt of quinolinic acid is heated in the presence of cadmium fluoride as a catalyst.

10. The process of producing furan-2,5-dicarboxylic acid, which comprises heating substantially anhydrous potassium salt of furan-2-carboxylic acid under anhydrous conditions in an atmosphere of carbon dioxide to about 300° C. to about 360° C. in the presence of cadmium fluoride as a catalyst until a substantial amount of the dipotassium salt of furan-2,5-dicarboxylic acid is formed, dissolving the dipotassium salt of furan-2,5-dicarboxylic acid in water, converting the dipotassium salt of furan-2,5-dicarboxylic acid into free furan-2,5-dicarboxylic acid by acidifying the aqueous solution with hydrochloric acid, and separating the free furan-2,5-dicarboxylic acid from the acidified solution.

11. The process according to claim 10, wherein the potassium salt of furan-2-carboxylic acid is heated in an atmosphere of nitrogen and in the presence of cadmium chloride as a catalyst.

12. The process of producing thiophene-2,5-dicarboxylic acid, which comprises heating substantially anhydrous potassium salt of thiophene-2-carboxylic acid under anhydrous conditions in an atmosphere of carbon dioxide to above about 340° C. and below the decomposition temperature of the starting material in the presence of cadmium oxide as a catalyst until a substantial amount of the dipotassium salt of thiophene-2,5-dicarboxylic acid is formed, dissolving the dipotassium salt of thiophene-2,5-dicarboxylic acid in water, converting the dipotassium salt of thiophene-2,5-dicarboxylic acid into free thiophene-2,5-dicarboxylic acid by acidifying the aqueous solution with hydrochloric acid, and separating the free thiophene-2,5-dicarboxylic acid from the acidified solution.

13. The process according to claim 1 in which the alkali metal salt starting material is the potassium salt of pyrrole-2-carboxylic acid and the product produced is pyrrole-2,5-dicarboxylic acid.

14. The process according to claim 1 in which the alkali metal salt starting material is the potassium salt of pyrazine-dicarboxylic acid 2,3 and the product produced is pyrazine-2,5-dicarboxylic acid.

15. The process according to claim 1 in which the alkali metal salt starting material is the potassium salt of quinaldic acid and the product produced is quinoline-2,4-dicarboxylic acid.

References Cited in the file of this patent

UNITED STATES PATENTS

| 2,823,229 | Raecke | Feb. 11, 1958 |
| 2,823,230 | Raecke | Feb. 11, 1958 |

FOREIGN PATENTS

| 522,829 | Belgium | Oct. 15, 1953 |

OTHER REFERENCES

Weidel et al.: Ber. Deut. Chem., vol. 12, p. 2006 (1879).

Paal et al.: Ber. Deut. Chem., vol. 18, p. 458 (1885).

UNITED STATES PATENT OFFICE
Certificate of Correction

Patent No. 2,900,386   August 18, 1959

Bernhard Raeche et al.

It is hereby certified that error appears in the printed specification of the above numbered patent requiring correction and that the said Letters Patent should read as corrected below.

Column 2, lines 19 to 23, the formula should appear as shown below instead of as in the patent—

Signed and sealed this 8th day of March 1960.

[SEAL]

Attest:
KARL H. AXLINE,
*Attesting Officer.*

ROBERT C. WATSON,
*Commissioner of Patents.*